S. H. MALLINSON.
ANIMAL BLANKET.
APPLICATION FILED APR. 3, 1922.
1,437,255. Patented Nov. 28, 1922.
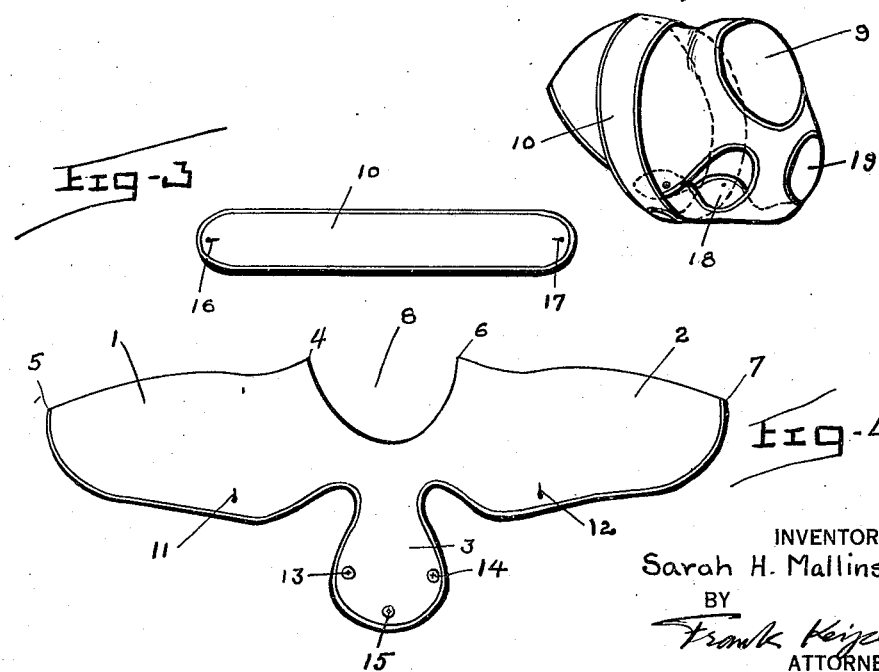
INVENTOR
Sarah H. Mallinson
BY
Frank Keyes
ATTORNEY Patented Nov. 28, 1922.

1,437,255

UNITED STATES PATENT OFFICE.

SARAH H. MALLINSON, OF ROCHESTER, NEW YORK.

ANIMAL BLANKET.

Application filed April 3, 1922. Serial No. 549,070.

*To all whom it may concern:*

Be it known that I, SARAH H. MALLINSON, a citizen of the United States of America, residing at Rochester, in the county of Monroe and State of New York, have invented certain new and useful Improvements in Animal Blankets, of which the following is a specification.

The object of this invention is to provide a new and improved form of blanket which is used as a cover for animals, especially dogs.

Another object of this convention is to make this blanket so that it cannot slide off or be disarranged on the animal.

This and other objects of this invention will be fully illustrated in the drawing, described in the specification, and pointed out in the claims at the end thereof.

In the accompanying drawing:

Figure 1 is an illustration of a dog wearing one of the blankets.

Figure 2 is a detail perspective view of the blanket showing the method of fastening the free ends of the blanket together to hold the same in place on the animal.

Figure 3 is a detail plan view of the belt forming part of the cover or blanket.

Figure 4 is a detail plan view of the cover or blanket before it is sewed together into the form illustrated in Figures 1 and 2.

In the several figures of the drawing like reference numerals indicate like parts.

Animal blankets or covers of the kind illustrated in the accompanying drawing, and forming the subject matter of this invention, are used to cover animals such as dogs to keep them warm when shipping them to distant points, because during transit these animals are usually exposed to cold weather, drafts or quick changes in temperature depending on the climatic conditions of the country and the season during which the animal is being shipped. The cover is also desirable for the purpose of keeping the animal warm while riding in an automobile or other vehicle. For this reason it is desirable to provide a blanket that can be securely fastened to the animal without making it uncomfortable.

In my present invention the blanket is made up from a single piece of goods which is cut out in the form illustrated in Figure 4. This form comprises the side sections 1 and 2 and the middle section 3. The sections 1 and 2 together make up the portion of the cover which surrounds the central portion of the body of the animal and the middle section 3 is provided to cover the front or chest of the animal. For this purpose the sections 1 and 2 are sewed together along their outer edge between the points 4—5 and 6—7 respectively. In so doing the cut-out portion 8 provided in the layout between the sections 1 and 2 is closed to form the opening 9 in the completed blanket through which the head of the animal is passed when placing the blanket on the animal.

Before the sections 1 and 2 are sewed together as above pointed out the blanket is bound around the outer edge thereof except between the points 4—5 and 6—7 as illustrated in Figure 4. The two sections 1 and 2 are then sewed together with the raw edges on the upper or right side. The belt 10 is then fastened to the middle of the blanket at the top thereof along the seam between the sections 1 and 2. A binding is then sewed over the seam and the belt to finish the raw edges of the seam. This leaves the seam smooth on the underside of the blanket where it comes in contact with the back of the animal.

As illustrated in Figure 4 each of the sections 1 and 2 is provided with a button hole 11 and 12 respectively, while the middle section 3 is provided with three buttons 13, 14 and 15. The belt 10 is provided with the button holes 16 and 17 one near each of the free ends thereof.

When, therefore, the blanket or cover is sewed up in the form illustrated in Figures 1 and 2 the buttons 13 and 14 can be buttoned through the button holes 11 and 12 while the button 15 is buttoned through both of the button holes 16 and 17 of the belt which, for this purpose, is placed down on the side of the combined sections 1 and 2, its free ends slightly overlapping each other on the under side of the middle section 3 at the point where the button 15 is placed to hold the rear end of the middle section in place under the body of the animal. When the different sections of the cover or blanket are buttoned together in this manner, the neck of the animal projects through the opening 9 in the blanket or cover, while the middle section 3 with the sections 1 and 2 form a pair of openings 18 and 19 through which the front legs of the animal project. The sections of the blanket are thus securely held to the body of the animal and the head and front legs of the animal for which suitable openings are provided in the blanket, hold the blanket in place on the body of the animal in a predetermined position and prevent its sliding off therefrom or its displacement thereof so that almost the entire body of the animal is covered by the blanket at all times.

The blanket is placed on the animal by first passing its head through the opening 9 in the blanket. After this is done the middle section is passed through between the front legs of the animal and then buttoned to the sides of the cover. The ends of the belts are then buttoned to the middle section of the blanket to help support this section on the underside of the body of the animal.

I claim:

1. An animal blanket made up of a single piece of goods having an opening formed at the front thereof, a section provided at the front of the blanket below the opening therein, said section having its free end adapted to extend rearwardly between the front legs of the animal and means for fastening the free end of said section to the blanket proper on the under side of the body of the animal to form a pair of openings between said section and the blanket proper through which the front legs of the animal are adapted to project, said means for fastening said free section being adapted to be unfastened from said blanket.

2. An animal blanket made up of a single piece of goods, having an opening formed at the front thereof, a section provided at the front of the blanket below the opening therein, said section being adapted to extend rearwardly between the front legs of the animal and be fastened to the blanket proper on the under side of the body of the animal, a belt fastened to the middle of the blanket and adapted to be buttoned to the rear end of said section to hold said section in place on the under side of the body of the animal.

3. An animal blanket made up of a single piece of goods and formed up of two side sections and a middle section, all adjoining a semicircular cutout portion, said two side sections being sewed together to form an opening in the end of the blanket, said middle section depending from the front of the blanket formed by said two side sections and being adapted to extend rearwardly thereof, buttons and button holes provided in said blanket adapted to fasten the middle section to said side section to form a blanket that completely surrounds the body of the animal.

4. An animal blanket made up of a single piece of goods and formed up of two side sections and a middle section, all adjoining a semicircular cutout portion, said two side sections being sewed together to form an opening in the end of the blanket, said middle section depending from the front of the blanket formed by said two side sections and being adapted to extend rearwardly thereof, buttons and button holes provided in said blanket adapted to fasten the middle section to said side section to form a blanket that completely surrounds the body of the animal, a belt fastened to said blanket at the seam between said two side sections said belt being adapted to surround said blanket and support the rear end of said middle section between said side sections.

In testimony whereof I affix my signature.

SARAH H. MALLINSON.